United States Patent [19]
Everett

[11] Patent Number: 5,464,075
[45] Date of Patent: Nov. 7, 1995

[54] BICYCLE BRAKE SHOE WITH CLEANING PORTION

[76] Inventor: Richard C. Everett, 225 Sunshine La., West Linn, Oreg. 97068

[21] Appl. No.: 262,526

[22] Filed: Jun. 20, 1994

[51] Int. Cl.⁶ .............................. F16D 69/00; B62L 1/10
[52] U.S. Cl. ...................... 188/24.12; 188/73.1; 188/259
[58] Field of Search .............................. 188/24.11, 24.12, 188/73.1, 250 B, 250 C, 250 E, 250 G, 250 H, 250 R, 251 R, 259

[56] References Cited

U.S. PATENT DOCUMENTS

| | | | |
|---|---|---|---|
| 4,135,606 | 1/1979 | Lewis | 188/24.12 |
| 4,230,208 | 10/1980 | Gale | 188/24.12 X |
| 5,107,965 | 4/1992 | Yates | 188/24.11 X |
| 5,113,975 | 5/1992 | Zucchero | 188/24.12 |

Primary Examiner—Robert J. Oberleitner
Assistant Examiner—Alfred Muratori
Attorney, Agent, or Firm—Edward E. Roberts

[57] ABSTRACT

A brake shoe having an elongate generally clam-shell shaped metallic support or backbone member, the leading edge of which is provided with a deflectable tongue portion bent at an angle and flexible relative to the main body portion, with first and second brake pads molded thereabout to provide a unitary assembly, with a fastening member secured generally perpendicular to the main body portion. The first and second brake pads are formed of dissimilar material and separated by a recess or V-shaped notch to permit flexing at the recess. The leading brake pad is formed of a long wearing low friction material, while the trailing or rear brake pad is formed of high friction compound. The backbone member is formed by stamping, with the two brake pads molded over the stamping.

16 Claims, 1 Drawing Sheet

BICYCLE BRAKE SHOE WITH CLEANING PORTION

BACKGROUND OF THE INVENTION

The background of the invention will be discussed in two parts:

1. Field of the Invention

This invention relates to bicycle brakes and more particularly to unitary bicycle brake pads having dissimilar first and second brake pad portions molded onto a flexible backbone for providing rim cleaning with uniform braking and wear.

2. Description of the Prior Art

Some bicycles have brake assemblies mounted to the frame for gripping of the rim in response to operator manipulation of brake levers. Such brake assemblies generally include brake shoes, which are movably mounted on caliper assemblies which bridge the rim, with such brake shoes having a brake pad of friction material for abuttingly and frictionally engaging the rim for slowing or stopping of the bicycle.

The majority of such brake pads have some form of design in the engaging surface to promote friction, somewhat similar to the tread design of the tires. In addition, some of such brake shoes have had incorporated therein some water diverting, or rim cleaning devices in advance of the brake pad utilized for stopping.

Exemplary of a prior art brake pad with a water diverting device is U.S. Pat. No. 5,113,975, issued May 19, 1992 to Zucchero, entitled "Bicycle Rim Water Deflecting Apparatus."

Another attempt at removing moisture at the engaging surface of the brake pad is shown in U.S. Pat. No. 5,107,965, issued Apr. 28, 1992, to Yates for "Vehicle Friction Brakes," the brake member being formed of a main body, hinge portion and scraper element formed integrally of plastic material. Separable brake pads are attached into walled openings in the main body which are provided with projections for frictionally retaining the pads therein.

Such prior art devices are not rugged and capable of withstanding the rigors of hard bike riding, such as racing or mountain bike riding. With separable brake pads, there is always the possibility of separation of the pad from its supporting opening.

It is a feature of the present invention to provide a new and improved unitary bicycle brake shoe having dissimilar first and second brake pad portions molded onto a flexible backbone, with the two portions at an angle to one another to enable cleaning of the rim by one portion and braking by both portions.

SUMMARY OF THE INVENTION

The foregoing and other objects of the invention are accomplished by providing a brake shoe having an elongate generally clam-shell shaped metallic support or backbone member, the leading edge of which is provided with a deflectable tongue portion bent at an angle and flexible relative to the main body portion, with first and second brake pads molded thereabout to provide a unitary assembly, with a fastening member secured generally perpendicular to the main body portion.

The first and second brake pads are formed of dissimilarly material and separated by a recess or V-shaped notch to permit flexing at the recess. The leading brake pad is formed of a long wearing low friction material, while the trailing or rear brake pad is formed of a high friction compound. The backbone member is formed by stamping, with the two brake pads molded over the stamping.

Other objects, features and advantages of the invention will become apparent from a reading of the specification, when taken in conjunction with the drawings, in which like reference numerals refer to like elements in the several views.

DESCRIPTION OF THE PREFERRED EMBODIMENT

Figure 1:
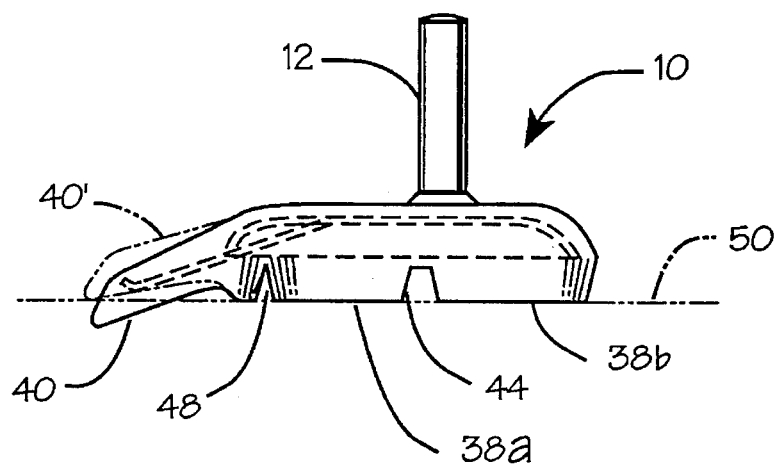
FIG. 1 is a side elevational view, partially cross-sectioned, showing the interior construction of the friction material molded about the backbone of FIG. 2 to form the brake shoe according to the invention.
Figure 2:
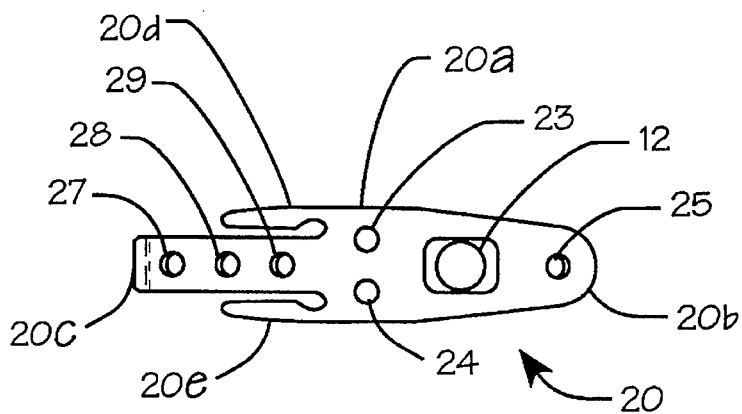
FIG. 2 is a top plan view of the stamping from which the backbone of the brake shoe of FIG. 1 is made.

Referring now to the drawings, and particularly to FIGS. 1 and 2, there is shown a brake shoe assembly, generally designated 10, which includes a fastening means, such as a threaded stud member 12 secured to a support member, such as the backbone, generally designated 20, which is shown in cross-section in FIG. 1 and more clearly in FIG. 2. The backbone 20 is formed of metal, such as spring steel, and formed by stamping, that is, an operation which cuts and forms the three-dimensional configuration of the backbone 20 in a continuous operation. The backbone 20 is stamped and formed into somewhat of an elongate clamshell shape with the opening being the portion on which the brake pads are formed.

For rigidity and to provide the surface area to promote maximum adhesion during molding of the brake pad materials about the backbone 20, the backbone 20 is essentially divided into a main body portion 20a, which, as best shown in FIG. 1, is generally channel-shaped, with a closed somewhat cup-shaped heel portion 20b, and a flexible tongue portion 20c. Tongue portion 20c is angled relative to the main plane of the main body portion 20a, the angle being such that the free end of the tongue portion 20c is pointed in the direction of the rim (not shown) and extends below a plane defined by the brake material, as will be described. Tongue portion 20c is centered on the longitudinal axis of the backbone 20 and formed as a generally planar strap shaped extension with minimum contouring to enable flexure under force of application of the brakes of the bicycle.

The backbone 20 also includes first and second generally parallel arm projections 20d, 20e, generally coextensive with the sidewalls of the main body portion 20a and generally parallel to the tongue portion 20c with slots therebetween. As shown in more clearly in FIG. 2, the spacing between the proximate facing edges of the arm projections 20d, 20e is greater than the width of the tongue 20c to provide room for friction material in the slots intermediate the tongue portion 20c and the projections 20d, 20e, during (and after ) the molding process. The friction material acts in part as a frictional or resilient webbing for providing additional support during flexure of the tongue 20c during use. The arm projections 20d, 20e extend in the same direction as the tongue portion 20c, are of shorter length, and are essentially mirror images of one another with a contoured configuration, that is, they are not planar.

Apertures are also provided in the backbone 20, such as apertures 23–25 in the main surface of the main body portion 20a, and apertures 27–29 formed in the tongue portion 20c. These apertures enable fluid material to pass therethrough during molding of the brake pad material to the backbone 20 to thereby provide a unitary brake shoe with maximum adhesion of the molded friction material to the backbone 20.

Figure 4:
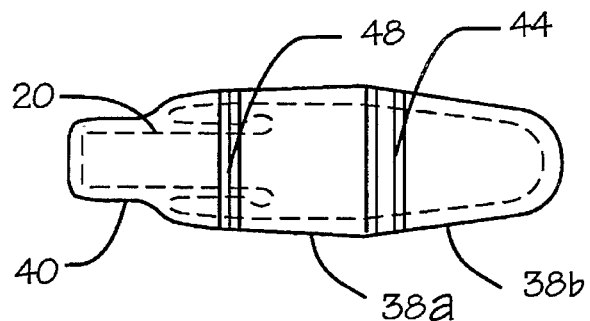
FIG. 4 is a bottom view of the brake shoe of FIG. 1.
Figure 3:
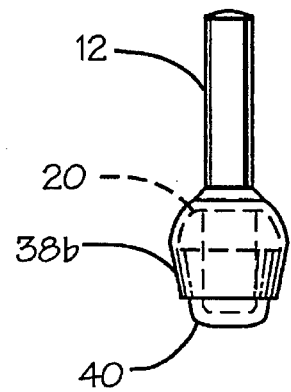
FIG. 3 is an end view of the brake shoe taken from the trailing edge of the brake shoe as shown in FIG. 1.

As shown in FIGS. 1 and 4, and to some degree in FIG. 3, the brake shoe 10 has pad means in the form of a first pad 38 (formed as two pad portions 38a and 38b), formed of friction material molded about the backbone 20. A second pad 40 is likewise formed about the tongue portion 20c.

By reference to the FIGS. 1, 2, and 4, the leftmost end of the brake shoe 10 will be referred to as the leading end while the rightmost end will be referred to as the trailing end, that is, the relative motion of the bicycle rim will be from left to right as viewed in the drawings with the friction pad 40 which is molded about tongue portion 20c coming into contact with the bicycle wheel rim prior to the pad 38 coming into contact with a given portion of the rim.

In accordance with the present invention, the brake pad portions 38 and 40 are molded of a friction material suitable for their purpose. The leading brake pad portion 40, or scraper pad, is formed of a long wearing low friction compound molded over the tongue 20c stamping; and to enhance the durability of the other brake pad portion, the trailing pad portion 38 is formed of a friction material of a more durable composition, such as of a different hardness, to assist in the uniform and even wear of the brake shoe 10 during use.

Molding material completely surrounds all surfaces of the stamping or backbone 20, that is the backbone 20 is embedded within the molding material, with the upper surface (as viewed in FIGS. 1 and 4), being contoured to the general configuration of the upper surface of the backbone 20.

The brake pad portions 38a and 38b are partially separated by a first V-shaped notch 44, while the leading brake pad 40 and the brake pad portion 38a of the trailing brake pad 38 are separated by a second V-shaped notch 48. The first V-shaped notch 44 assists in the dispersal of moisture or rain during use, while the second V-shaped notch does likewise but also helps with the spring flexure as the leading brake pad 40 comes into contact with the rim to deflect to its dotted line position 40', as shown in FIG. 1.

After molding, as shown in FIG. 1, the contact surfaces of the brake pad portions 38a and 38b lie in a common plane denoted by the broken line 50, which defines the plane to be placed in contact with the bicycle rim. The free end of the cleaning or scraper pad 40 depends below this line to enable initial contact of the pad 40 under low friction to clean mud, water and other debris from the rim, prior to contact with the rim of the other brake pad 38 of brake shoe assembly 10.

In other words, the first brake pad portion 40 will contact and clean the rim under low friction. Continued application of the brakes will flex the spring means provided by the tongue portion 20c of the backbone 20 to allow a second high friction stopping brake pad 38 to contact the rim for stopping the bicycle, this brake pad therefore being applied to a cleaner rim for more efficient stopping power. Since the flexural brake pad portion 40 is of long wearing material and is applied to the rim with less friction, this, when combined with its spring flex characteristics, results in less wear than that experienced by the second brake pad 38.

As an additional feature and as best shown in FIG. 1, the tongue portion 20c of the backbone 20 may be formed with an up-turned portion at the leading edge thereof. Thus, with any wearing away of the molding material of brake pad 40 to expose the metal of tongue portion 20c, the metal of tongue portion 20c would be deflected away from, and would not dig into, the bicycle rim.

While there has been shown and described herein a preferred embodiment, it is to be understood that various other adaptions and modifications may be made within the spirit and scope of the invention.

What is claimed is:

1. A brake shoe for urging against a rim of a bicycle wheel, the brake shoe comprising:

a backbone support member including an elongate channel member;

said support member having a deflectable tongue portion extending axially from said channel member, said tongue portion being oriented at an angle relative to an axis of said channel member;

a fastener member secured substantially transverse to said support member;

a first brake pad molded about a free end of said tongue portion and a second brake pad molded about the remainder of said support member and;

wherein upon movement of said brake shoe towards said rim of said bicycle wheel, said first brake pad is initially brought into contact with said rim for removal of debris from the rim, and upon continued movement of said brake shoe towards said rim, said first brake pad is deflected until said second brake pad is also brought into contact with said rim.

2. The brake shoe of claim 1 wherein said backbone support member further includes first and second integrally formed arm projections spaced one on each side of said tongue portion and in general alignment with said tongue portion.

3. The brake shoe of claim 1 wherein said tongue portion is formed as a generally planar deflectable strap member.

4. The brake shoe of claim 1 wherein said support member is of metallic composition, is formed by stamping, and includes aperture means therethrough for maximizing adhesion of said first and second brake pads molded about said tongue portion and said support member to form a unitary brake shoe.

5. The brake shoe of claim 1 wherein said second brake pad has greater braking effect on said rim than the braking effect of said first brake pad on said rim, material of said second brake pad having a greater coefficient of friction than material of said first brake pad.

6. The brake shoe of claim 5 wherein said tongue portion includes an up-turned substantially curved portion at a leading edge thereof, whereby when said first brake pad wears to expose said tongue portion, said tongue portion will be deflected away from said rim.

7. The brake shoe of claim 6 wherein said support member further includes first and second integrally formed arm projections spaced one on each side of said tongue portion and in general alignment with said tongue portion.

8. A brake shoe for a bicycle having a brake system urging a brake shoe against a rim of the bicycle, the brake shoe comprising:

an elongate metallic backbone support member having a main body portion of a somewhat shell-shaped configuration with a metallic generally planar deflectable tongue portion axially positioned relative to a longitudinal axis thereof;

a fastener member secured to said support member generally perpendicular to said longitudinal axis;

first brake pad means of long wearing low friction material molded about said tongue portion and second brake pad means of a high friction compound molded about the balance of said backbone support member, said first brake pad means having a surface for forming a plane for contact with the rim, said tongue portion being angularly oriented relative to said plane in a direction toward the rim of the bicycle for enabling initial contact with the rim by said first brake pad means for cleaning of the rim, and on continued application of the brake system for deflecting said first brake pad means until said second brake pad means comes into contact with the rim;

a v-shaped notch intermediate said first and second brake pad means on the rim contacting surfaces; and wherein said tongue portion includes an up-turned portion at a leading edge thereof whereby with any wearing away of the molded material of said first brake pad, said tongue portion will be deflected away from and not dig into the bicycle rim.

9. A brake shoe for contact with a rim of a bicycle wheel, said shoe comprising:

a backbone support member including an elongate channel member, said support member having a deflectable tongue portion which extends axially from the base of said channel member oriented at an angle relative to an axis of the channel member, and is flexible relative to, said backbone support member;

a first brake pad molded about a free end of said tongue portion and a second brake pad molded about the remainder of said backbone support member; and a fastening member secured substantially transverse to said backbone support member, said first and second brake pads being formed of dissimilar frictional material and having means therebetween to permit flexing of said first brake pad with respect to said second brake pad; and said tongue portion being oriented in a direction toward the rim of said bicycle wheel for initial contact of said first brake pad with said rim prior to contact of said second brake pad with said rim.

10. The brake shoe of claim 9 wherein said first brake pad is formed of long wearing low friction material, and said second brake pad is formed of high friction material capable of generating a degree of friction when brought into contact with said rim substantially greater than the friction generated from contact between said first brake pad and said rim.

11. The brake shoe of claim 9 wherein said backbone support member and said first and second brake pads are molded to form a unitary brake shoe.

12. The brake shoe of claim 9 wherein said tongue portion includes an up-turned curved portion at the leading edge thereof whereby with any wearing away of the molded material of said first brake pad, said tongue portion will be deflected away from and not dig into the bicycle rim.

13. The brake shoe of claim 9 wherein said means between said first and second brake pads to permit flexing of said first brake pad with respect to said second brake pad is a recess in said brake shoe separating said first and second brake pads.

14. A brake shoe for contact with a bicycle rim, said shoe comprising:

an elongate generally clam-shell shaped metallic backbone member, a leading edge of which is provided with a deflectable tongue portion bent at an angle and flexible relative to a main body portion; and first and second brake pads molded thereabout said backbone member to provide a unitary assembly, with a fastening member secured generally perpendicular to the main body portion, said first and second brake pads being formed of dissimilar frictional material and separated by a recess to permit flexing of said first brake pad at the recess, a free end of said first brake pad including said tongue portion and extending outwardly from a plane defined by a contact surface of said second brake pad, the outward extension being in a direction toward the rim for initial contact with the rim on application prior to contact with the rim by said second brake pad; and wherein said tongue portion includes an up-turned curved portion at the leading edge thereof whereby with any wearing away of the molded material of said first brake pad, said tongue portion will be deflected away from and not dig into the bicycle rim.

15. A brake shoe for contact with a rim of a bicycle wheel, said shoe comprising:

an elongate backbone support member having a leading deflectable tongue portion bent at an angle and flexible relative to the main body portion of said support member;

first and second brake pads molded about said tongue portion and said main body portion respectively to provide a unitary assembly, with a fastening member secured generally perpendicular to the main body portion;

said first and second brake pads being formed of dissimilar frictional material and having means therebetween to permit spring flexing of said first brake pad with respect to said second brake pad;

a free end of said first brake pad including said tongue portion being oriented at an angle from said main body portion whereupon movement of said brake shoe towards said rim of said bicycle wheel said first brake pad is initially brought into contact with said rim for debris removal from the rim prior to contact with the rim by said second brake pad which has a greater coefficient of friction for braking effect.

16. The brake shoe of claim 15 wherein said means between said first and second brake pads to permit flexing of said first brake pad with respect to said second brake pad is a recess in said brake shoe separating said first and second brake pads.

* * * * *